United States Patent [19]
Peters et al.

[11] Patent Number: 5,946,445
[45] Date of Patent: Aug. 31, 1999

[54] MEDIA RECORDER FOR CAPTURE AND PLAYBACK OF LIVE AND PRERECORDED AUDIO AND/OR VIDEO INFORMATION

[75] Inventors: Eric C. Peters, Carlisle; John J. Walsh, North Chelmsford, both of Mass.

[73] Assignee: Avid Technology, Inc., Tewksbury, Mass.

[21] Appl. No.: 08/465,233

[22] Filed: Jun. 5, 1995

Related U.S. Application Data

[63] Continuation of application No. 07/866,570, Apr. 10, 1992, abandoned.

[51] Int. Cl.[6] ........................................... H04N 5/76
[52] U.S. Cl. ................................... 386/52; 386/65
[58] Field of Search ............................ 358/335, 342, 358/311, 341, 343, 906; 300/33.1, 13.1; 348/552; 386/46, 125, 124, 906, 112, 52, 55, 65; 345/328; H04N 5/76

[56] References Cited

U.S. PATENT DOCUMENTS

| | | |
|---|---|---|
| 2,927,154 | 3/1960 | Wolfe . |
| 3,811,090 | 5/1974 | Uchida et al. ............................ 348/730 |
| 3,875,329 | 4/1975 | Nagel . |
| 4,195,317 | 3/1980 | Stratton . |
| 4,257,063 | 3/1981 | Loughry . |
| 4,295,154 | 10/1981 | Hata . |
| 4,378,572 | 3/1983 | Hoffmann .............................. 358/335 |
| 4,390,904 | 6/1983 | Johnston et al. ....................... 358/908 |
| 4,523,226 | 6/1985 | Lipton . |
| 4,538,188 | 8/1985 | Barker . |
| 4,567,532 | 1/1986 | Baer et al. .............................. 358/342 |
| 4,642,682 | 2/1987 | Orsburn . |
| 4,688,016 | 8/1987 | Fok . |
| 4,689,683 | 8/1987 | Efron . |
| 4,695,887 | 9/1987 | Peterson . |
| 4,695,888 | 9/1987 | Peterson . |
| 4,695,891 | 9/1987 | Peterson . |
| 4,739,398 | 4/1988 | Thomas . |
| 4,752,834 | 6/1988 | Koomes ................................ 358/335 |
| 4,755,889 | 7/1988 | Schwartz . |
| 4,774,570 | 9/1988 | Araki . |
| 4,777,537 | 10/1988 | Ueno et al. ............................ 358/341 |
| 4,792,864 | 12/1988 | Watanabe et al. ..................... 358/335 |
| 4,816,901 | 3/1989 | Music . |
| 4,823,285 | 4/1989 | Blancato ............................... 348/552 |
| 4,841,503 | 6/1989 | Yamada et al. ........................ 360/15 |
| 4,847,677 | 7/1989 | Music . |
| 4,855,813 | 8/1989 | Russell . |

(List continued on next page.)

FOREIGN PATENT DOCUMENTS 0 473 322 A1  4/1992  European Pat. Off. .........  H04N 3/36

OTHER PUBLICATIONS

Introducing Win/TV–Celebrity Advanced Features, product announcement dated Feb. 1994, Mar. 1994 and Apr. 1994.
A product description for WIN/TV–Celebrity Video System from Hauppage Computer Works, of Hauppage, New York dated Feb., Mar. and Apr., 1994.

*Primary Examiner*—Huy Nguyen
*Attorney, Agent, or Firm*—Wolf, Greenfield & Sacks, P.C.,

[57] ABSTRACT

The invention disclosed herein is a media recorder for recording live and prerecorded analog audio and/or video information. It is capable of receiving, digitizing, and storing analog audio and/or video information in real time. The invention detects discontinuities in the reception of the analog information and automatically terminates the storage of the information, so the previously received audio and/or video information is stored as a self-contained clip of digitized information. The invention is also capable of receiving and storing digital audio and/or video information from other sources, so that the system can play both the digital audio and/or video information digitized by it and that received from the other sources. This allows both the newly recorded and previously recorded media segments to be evaluated both individually and in context with other segments.

35 Claims, 1 Drawing Sheet

U.S. PATENT DOCUMENTS

| | | |
|---|---|---|
| 4,857,990 | 8/1989 | Horgan . |
| 4,864,429 | 9/1989 | Eigeldinger et al. ............... 358/310 |
| 4,872,054 | 10/1989 | Gray . |
| 4,879,611 | 11/1989 | Fukui et al. ........................ 358/335 |
| 4,894,789 | 1/1990 | Yee . |
| 4,918,523 | 4/1990 | Simon . |
| 4,928,171 | 5/1990 | Kline . |
| 4,935,816 | 6/1990 | Faber . |
| 4,963,995 | 10/1990 | Lang . |
| 4,969,042 | 11/1990 | Houtman et al. ................... 358/552 |
| 5,010,499 | 4/1991 | Yee . |
| 5,027,400 | 6/1991 | Baji . |
| 5,057,932 | 10/1991 | Lang . |
| 5,083,313 | 1/1992 | Reinsch . |
| 5,099,322 | 3/1992 | Gove . |
| 5,099,337 | 3/1992 | Cury ................................... 358/335 |
| 5,119,191 | 6/1992 | Van den Heuvel . |
| 5,121,440 | 6/1992 | Yee . |
| 5,124,807 | 6/1992 | Dunlap et al. ...................... 358/341 |
| 5,133,079 | 7/1992 | Ballantyne . |
| 5,134,661 | 7/1992 | Reinsch . |
| 5,138,459 | 8/1992 | Roberts et al. ..................... 348/552 |
| 5,140,414 | 8/1992 | Mowry . |
| 5,164,839 | 11/1992 | Lang . |
| 5,192,999 | 3/1993 | Graczyk et al. .................... 348/552 |
| 5,227,863 | 7/1993 | Bilbrey . |
| 5,231,501 | 7/1993 | Sakai ................................... 348/552 |
| 5,233,438 | 8/1993 | Funahashi et al. .................. 358/335 |
| 5,241,389 | 8/1993 | Bilbrey . |
| 5,253,078 | 10/1993 | Balkanski . |
| 5,262,877 | 11/1993 | Otsuka ................................ 358/342 |
| 5,267,351 | 11/1993 | Rober .................................. 395/600 |
| 5,270,831 | 12/1993 | Parulski . |
| 5,307,456 | 4/1994 | MacKay . |
| 5,568,275 | 10/1996 | Norton ................................ 386/52 |

MEDIA RECORDER FOR CAPTURE AND PLAYBACK OF LIVE AND PRERECORDED AUDIO AND/OR VIDEO INFORMATION

This application is a continuation of application Ser. No. 07/866,570, filed Apr. 10, 1992, abandoned.

BACKGROUND OF THE INVENTION

The invention belongs to the field of audio and video recording. Today, live recordings are usually made by storing a recorded analog signal on an audio or video tape. Tape is also generally the medium used for long-term storage of previously recorded material. This system is effective for the basic recording process, but it presents problems for the evaluation of recorded signals. The linear nature of tape, where later material is recorded on the continuous medium following earlier material, makes access to the recorded material difficult.

For example, the continuous nature of tape provides no convenient means of labeling or locating a particular segment. One segment follows on another with no means of delimiting the individual segments; the tape is in essence one long recording rather than a collection of the segments of which it consists. This makes location and access to a particular segment an imprecise process, even if a (manually made) notation of a segment's location is available. A different tape can be used for each segment, but that is an inefficient solution for reasons both of expense and volume of storage.

Audio and video tapes are also poor media for fast playback of recorded material. To play material recorded earlier, the tape must be rewound, which is a time-consuming process even if the location of the desired segment is known. Furthermore, it is often desirable to compare segments of recorded material on more than one tape, which requires switching the player from one tape to another. And to play more than one segment in succession, in order to view segments in context, for example, a new recording must be made or more than one player used, a cumbersome process at best.

SUMMARY OF THE INVENTION

The invention disclosed herein solves these and other problems. The invention is a digital media recorder with special features for recording live and prerecorded analog audio and/or video information. It is capable of receiving, digitizing, and storing analog audio and/or video information in real time. The invention provides the new capability of detecting a discontinuity in the reception of the analog information and automatically terminating the storage of the information, so the previously received audio and/or video information is stored as a self-contained clip of digitized information. Typically, the detection of a discontinuity in the reception of analog information relies on detection of a trigger signal from the recording device or a discontinuity in a time code signal received with the audio and/or video information.

The preferred embodiment of the invention is also capable of receiving and storing digital audio and/or video information from other sources, so that the system can play both the digital audio and/or video information that it receives directly and that received from the other sources. This allows both the newly recorded and previously recorded media segments to be evaluated both individually and in context with other segments. Moreover, since the media segments are stored digitally, they can be randomly accessed and played back essentially instantly.

Another aspect of the invention allows the automatic logging of format and statistical information regarding the recorded digital audio and/or video clips as they are recorded.

Finally, in a preferred embodiment, the invention is packaged so as to enable the system to withstand shocks for portable operation.

DESCRIPTION OF THE PREFERRED EMBODIMENT

Figure 1:
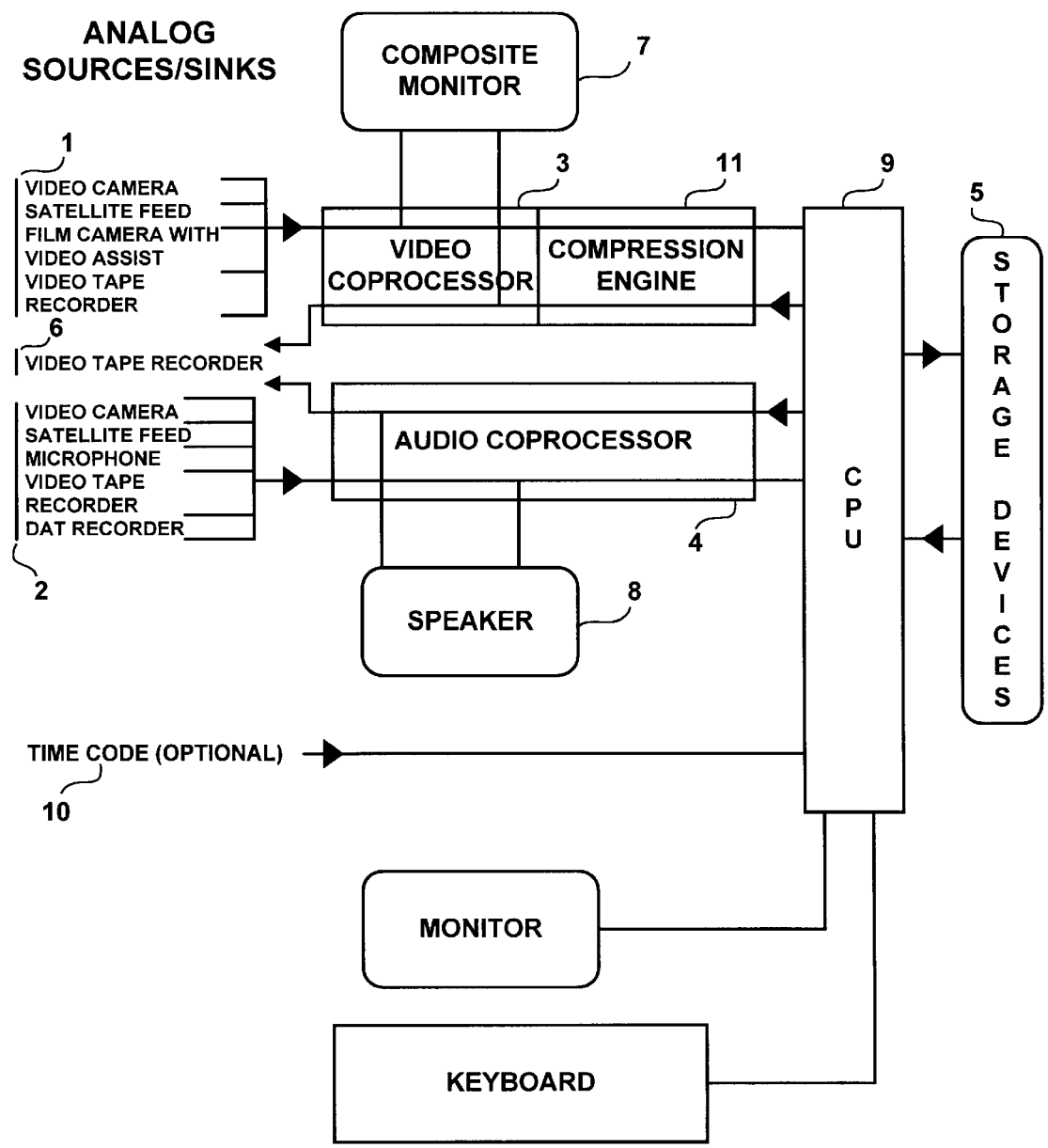
FIG. 1 is a block diagram of the interconnections among the components of the invention.

The invention disclosed herein is a digital media recorder that provides several features useful particularly in recording and evaluating live audio and/or video material. Since the invention stores material digitally, typically on a magnetic disk or in a computer memory, the material can be randomly and immediately accessed, which greatly facilitates the review of material recorded on site. No time is required for developing, as with film, or rewinding, as with videotape. In addition, the system's computer monitors an incoming signal, so when recording ceases the computer prepares the just-recorded information as a self-contained clip that can be immediately played back if desired. The invention's features are more fully discussed in the following paragraphs.

FIG. 1 illustrates the structure of the invention. As the figure shows, analog video sources 1 and analog audio sources 2 are received by video coprocessor 3 and audio coprocessor 4, respectively. (Such digitizing processors are known in the art and commercially available, as for example in products from Avid Technology, Inc., Tewksbury, Mass.). Each of the coprocessors digitizes incoming material and stores it on storage devices 5. (In the figure, compression engine 11 compresses the video information before it is stored, but compression is not essential to the invention.) Storage devices 5 can also contain previously recorded digital media files. Both the digitized material and the previously recorded files can be retrieved and played through video monitor 7 and speakers 8.

The invention provides for the recording of live audio and/or video information by storing each recorded segment as an individual "clip" of material. Typically a production session involves not one long continuous recording but a succession of short takes. As noted above, conventional linear recording techniques record the segments successively on one tape, making it difficult and time-consuming to review earlier takes. In contrast, computer 9 of the present invention monitors the incoming signal, and, on detecting a discontinuity, it stores the recorded information as a clip of material. Then, when recording resumes, the invention begins storing another clip. (Starting and stopping the recording process uses techniques known in the art. For example, the computer would open a disk file and store frames of video data repeatedly until the discontinuity was detected, at which point it would close the file and perhaps store an indication of the total number of frames in the file.) A discontinuity can be detected in any of several ways known to those skilled in the art; a typical approach would be to respond to a trigger signal produced by an audio recorder or video camera or to monitor a time code signal (note time code 10 in FIG. 1) and cease recording when the time code stops advancing.

The recording of material as self-contained clips has several advantages. Foremost among them is that when a clip has been recorded it can be immediately played back. This is useful to enable an operator to immediately determine whether the recording is satisfactory or whether it should be recorded again. This capability is useful not just for video productions but also for film productions where the film camera has a video assist. Moreover, an aspect of the invention is to allow recording of video at twenty-four frames per second to match film speed, rather than at the thirty-frame-per-second rate of normal video. In addition, recording audio and/or video material as distinct clips allows the material to be given informative labels and permits logging of format or statistical information about the material. (The logged information could include any of the following items: number of video frames per second, video resolution, number of audio channels, audio sampling rate, length of clip, time of recording, or start and stop timecodes.) The logged information is stored with the clips, and then the clips can be automatically organized by date of recording or length, a process that would not be convenient with linear recording techniques.

The invention provides especially useful means for evaluating newly recorded material in light of previously recorded material. Both the new material and previous material are stored in a random-access storage device, such as a disk or computer memory, and since both are digital, they can be accessed and displayed immediately, without the record and search time of conventional recording. As noted above, this allows all the different clips to be compared, so, for example, a segment taped yesterday can be compared with one from today. No switching of tapes is required, since all the clips are stored on a random-access device.

Even more significantly, though, the invention's storage of clips on disk or in memory allows multiple clips to be played back in sequence. This is possible, again, due to the random-access storage of the clips. Thus, a just-completed clip can be played in the context of previously recorded segments in much the same way as it would appear in a final program. This allows the new clip to be evaluated much more usefully. With conventional recording techniques, this process would require much rewinding and swapping of tapes, so that the benefits of immediate playback would be lost.

Finally, since the features of this invention are especially useful for on-site, live recording, it is also designed for portability. Adapting a computer and video system such as this one for portability involves techniques well known to those skilled in the art. The electronic components must be built to withstand jarring so that connections do not loosen, extra ventilation must be provided so that the system can operate in hot environments, and the entire system must be packaged as compactly as possible. Portability allows the advantages of the invention to be used on location as well as in a studio.

What is claimed is:

1. A media recorder for digitally recording a live video signal defining a moving picture, the media recorder comprising:
    a. means for receiving the live video signal from a video source;
    b. means for capturing and storing, in real time as the live video signal is received, a digitized version of the moving picture defined by the live video signal as a computer data file on a non-volatile random-access computer-readable and rewritable medium;
    c. means for detecting a trigger signal from the video source; and
    d. means for controlling the means for capturing and storing to close the computer data file upon detection of the trigger signal by the means for detecting.

2. The media recorder of claim 1, further comprising means for automatically logging format and statistical information regarding the recorded digitized version of the live video signal stored in the computer data file.

3. The media recorder of claim 2, wherein the format and statistical information includes at least one of the following: number of video frames per second, video resolution, length of clip, time of recording, and start and stop timecodes.

4. The media recorder of claim 1, further comprising means for reading both the digitized version of the video signal and another similarly digitized video signal from the medium and for displaying the digitized version of the video signal and the other similarly digitized video signal on a video display individually and in sequence.

5. The media recorder of claim 1, wherein the live video signal is obtained from a satellite feed.

6. The media recorder of claim 1, wherein the live video signal is obtained from a video camera.

7. The media recorder of claim 1, further comprising means, connected to receive a live audio signal, for digitizing the live audio signal and for storing the digitized audio signal on the nonvolatile random-access, computer-readable and rewritable medium.

8. The media recorder of claim 1, wherein the means for detecting includes a computer to receive the live video signal and detect the trigger signal from the video source.

9. The media recorder of claim 1, wherein the means for detecting includes means for monitoring a trigger signal from the video source and for determining when the trigger signal indicates the live video signal has stopped.

10. The media recorder of claim 9, further comprising:
    means for opening a new computer data file when the means for monitoring and determining determines that the trigger signal indicates the live video signal has become active.

11. A media recorder for digitally recording a prerecorded video signal defining a plurality of moving picture segments, from a video tape into a computer-readable form, the media recorder comprising:
    a. means for receiving the prerecorded video signal from the video tape;
    b. means for capturing and storing, in real time as the prerecorded video signal is received, a digitized version of at least one moving picture segment of the plurality of moving picture segments defined by the prerecorded video signal as a computer data file on a non-volatile random-access computer-readable and rewritable medium;
    c. means for detecting a discontinuity in a time code signal received with the prerecorded video signal; and
    d. means for closing the computer data file and for opening a next computer data file to store a digitized version of a next moving picture segment upon detection of the discontinuity in the time code signal by the means for detecting.

12. The media recorder of claim 11, further comprising means for logging format and statistical information regarding the recorded digitized version of the prerecorded video signal stored in the computer data file.

13. The media recorder of claim 12, wherein the format and statistical information includes at least one of the following: number of video frames per second, video resolution, length of clip, time of recording, and start and stop timecodes.

14. The media recorder of claim 11, wherein the means for detecting includes a computer to receive the prerecorded video signal and to detect a discontinuity in the time code signal.

15. The media recorder of claim 11, wherein the means for detecting includes a computer to receive the time code signal and to determine when the time code signal stops advancing.

16. The media recorder of claim 15, further comprising:
   means for opening a new computer data file when the computer determines that the time code signal begins advancing.

17. A media recorder for digitally recording a live video signal defining a moving picture, from a video source, the media recorder comprising:
   a trigger signal detector having an input connected to the video source and an output indicative of whether a trigger signal is detected from the video source; and
   a video processor having a first input connected to receive the live video signal and a second input connected to the output of the trigger signal detector, and which captures a digitized version of the moving picture defined by the live video signal in real time as the live video signal is received and which stores the digitized version as a computer data file on a non-volatile random-access computer-readable and rewritable medium and which closes the computer data file when the trigger signal detector indicates detection of the trigger signal.

18. The media recorder of claim 17, further comprising means for automatically logging format and statistical information regarding the recorded digitized version of the live video signal stored in the computer data file.

19. The media recorder of claim 18, wherein the format and statistical information includes at least one of the following: number of video frames per second, video resolution, length of clip, time of recording, and start and stop timecodes.

20. The media recorder of claim 17, wherein trigger signal detector includes a computer having an input connected to the video source to receive the trigger signal and to determine when the trigger signal indicates the live video signal has stopped.

21. A media recorder for digitally recording a prerecorded video signal defining a plurality of moving picture segments, from a video tape into a computer-readable form, the media recorder comprising:
   a time code discontinuity detector having an input connected to receive a time code signal which accompanies the prerecorded video signal and an output indicative of whether the time code signal is continuous; and
   a video processor having a first input connected to receive the prerecorded video signal from the video tape and a second input connected to the output of the time code discontinuity detector, and which captures a digitized version of the prerecorded video signal in real time as the prerecorded video signal is received and which stores the digitized version of at least one of the moving picture segments of the plurality of moving picture segments in a computer data file on a nonvolatile random-access computer-readable and rewritable medium and which closes the computer data file when the output of the time code discontinuity detector indicates the time code signal is not continuous, and which starts storage of another of the moving picture segments of the plurality of moving picture segments in a separate computer data file after the time code discontinuity detector indicates the time code signal is not continuous.

22. The media recorder of claim 21, further comprising means for automatically logging format and statistical information regarding the recorded digitized version of the prerecorded video signal stored in the computer data file.

23. The media recorder of claim 22, wherein the format and statistical information includes at least one of the following: number of video frames per second, video resolution, length of clip, time of recording, and start and stop timecodes.

24. The media recorder of claim 21, wherein the time code discontinuity detector includes a computer having an input to receive the prerecorded video signal and an input to receive the time code signal of the prerecorded video signal to determine when the time code signal stops advancing.

25. A method for digitally recording a live video signal defining a moving picture, in a computer-readable form, the method comprising the steps of:
   a. receiving the live video signal from a video source;
   b. capturing a digitized version of the moving picture defined by the live video signal and storing the digitized version as a computer data file on a non-volatile random-access computer readable and rewritable medium in real time as the live video signal is received;
   c. detecting a trigger signal from the video source; and
   d. closing the computer data file upon detection of the trigger signal.

26. The method of claim 25, further comprising the step of automatically logging format and statistical information regarding the recorded digitized version of the live video signal stored in the computer data file.

27. The method of claim 26, wherein the format and statistical information includes at least one of the following: number of video frames per second, video resolution, length of clip, time of recording, and start and stop timecodes.

28. The method of claim 25, wherein the step of detecting includes steps of sending the live video signal to a computer; and
   the computer detecting the trigger signal.

29. The method of claim 25, wherein the step of detecting includes steps of monitoring the trigger signal and determining when the trigger signal indicates the live video signal has stopped.

30. The method of claim 29, further comprising steps of:
   when the trigger signal indicates the live video signal has become active, opening a new computer data file and repeating steps (a)–(d).

31. A method for digitally recording a prerecorded video signal defining a plurality of moving picture segments, from a video tapes in a computer-readable form, the method comprising the steps of:
   a. receiving the prerecorded video signal from the video tape, including a time code signal;
   b. capturing a digitized version of the prerecorded video signal and storing the digitized version of at least one moving picture segment of the plurality of moving picture segments in a computer data file on a nonvolatile random-access computer readable and rewritable medium in real time as the video signal is received;
   c. detecting a discontinuity in the time code signal; and
   d. closing the computer file and opening a next computer data file to store a digitized version of a next moving picture segment of the plurality of moving picture segments upon detection of the discontinuity in the time code signal.

32. The method of claim 31, further comprising the step of automatically logging format and statistical information regarding the recorded digitized version of the prerecorded video signal stored in the computer data file.

33. The method of claim 32, wherein the format and statistical information includes at least one of the following: number of video frames per second, video resolution, length of clip, time of recording, and start and stop timecodes.

34. The method of claim 31, wherein the step of detecting includes steps of sending the time code signal to a computer and the computer determining when the time code signal stops advancing.

35. The method of claim 34, further comprising steps of:

when the time code signal begins advancing, opening a new computer data file and repeating steps (a)–(d).

* * * * *